Sept. 7, 1954  
W. E. BAUER  
FLUID PRESSURE RECIPROCATING MOTOR  
AND CONTROL VALVE APPARATUS  
Filed March 21, 1950

2,688,313

WITNESSES:
John M. Wright
E. H. Lutz

INVENTOR
William E. Bauer

BY
Ralph T. French
ATTORNEY

Patented Sept. 7, 1954

2,688,313

UNITED STATES PATENT OFFICE 2,688,313

FLUID PRESSURE RECIPROCATING MOTOR AND CONTROL VALVE APPARATUS

William E. Bauer, Philadelphia, Pa., assignor, by mesne assignments, to the United States of America as represented by the Secretary of the Navy Application March 21, 1950, Serial No. 150,934

1 Claim. (Cl. 121—38)

This invention relates to fluid pressure actuating apparatus and more particularly to a double acting fluid motor for actuating aircraft auxiliaries and the like.

It is an object of this invention to provide an improved fluid pressure actuator suitable for operation in high temperature zones and comprising means for maintaining the motive fluid cool during periods of inactivity.

Another object of the invention is to provide a fluid pressure motor apparatus constructed and arranged for effecting continuous circulation of the motive fluid to ensure cooling thereof.

A further object is the provision of a fluid pressure motor apparatus having a construction rendering it particularly suitable for controlling operation of a variable area nozzle device for an aviation engine of the jet propulsion type.

These and other objects are effected by my invention as will be apparent from the following description and claim taken in connection with the accompanying drawings, forming a part of this application, in which:

Figure 1:
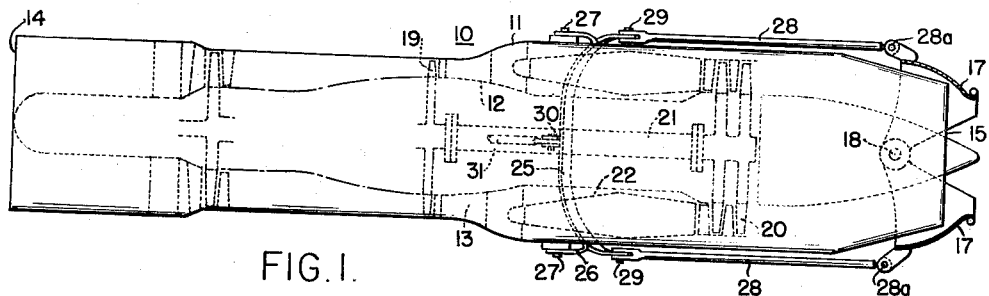
Fig. 1 is a diagrammatic plan view of a typical aviation gas turbine power plant having a variable area exhaust nozzle adapted to be actuated by a fluid pressure motor embodying the invention.

As shown diagrammatically in Fig. 1, a gas turbine power plant 10 with which the invention is adapted to be associated in a suitable compartment of an aircraft (not shown) may comprise an outer generally cylindrical casing structure 11 having longitudinally mounted therein a core structure 12, forming an annular passageway 13 which extends through the plant from a forwardly directed air inlet opening 14 to a rearwardly disposed exhaust nozzle 15. The flow area of the nozzle 15 is variable in accordance with cooperation of a pair of movable arcuate closure members 17, which are pivotally connected to suitable pins 18 carried by the casing structure 11 diametrically at opposite points adjacent the nozzle. The usual operating elements of the power plant 10 are arranged in axial alignment therein, and include an axial flow compressor 19, a driving turbine 20 connected thereto by means of a shaft 21, and annular combustion apparatus 22, which is interposed in the passage 13 between the discharge end of the compressor and the inlet of the turbine. In operation, air entering the inlet opening 14 is compressed by the compressor 19 and delivered through passage 13 to the combustion apparatus 22. Fuel supplied to the latter, by way of suitable manifold and nozzles (not shown), is burned in the stream of air under pressure, creating motive gases which are expanded through the turbine 20 and finally discharged to atmosphere through the nozzle 15, establishing a propulsive thrust.

Figure 2:
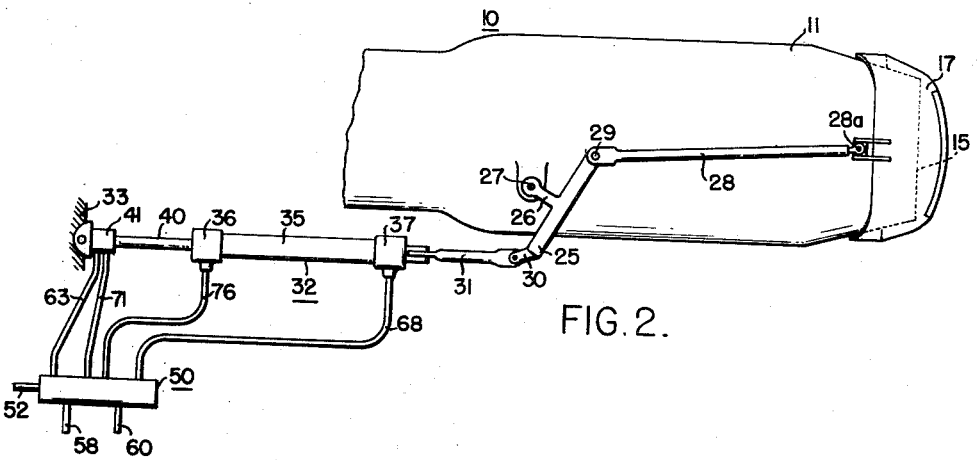
Fig. 2 is a fragmentary elevational view of the same power plant, showing a suitable means for connecting the nozzle elements to the actuating motor constructed in accordance with the invention.

The movable closure members 17 are constructed and arranged for operation, in a manner well understood in the art, to effect variations in the nozzle area in order to control engine thrust and also to afford a means for limiting the operating temperature of the turbine 20. For operating the closure members 17, suitable linkage may be provided, such as that illustrated in Figs. 1 and 2 and comprising an arcuate lever or bail 25 having parallel arm portions 26 pivotally connected to pins 27 carried on opposite sides of the casing structure 11, and a pair of longitudinally disposed rods 28, each of which has one end pivotally connected to a pin 28a carried by the adjacent nozzle closure member 17 and the other end pivotally connected by a pin 29 to the corresponding free end of the bail 25. A lug 30, formed on the bail 25 intermediate the ends thereof, is operatively connected through the medium of a link 31 to a fluid pressure motor or actuator device 32, which may be mounted on suitable bracket means, indicated generally at 33, carried either by the engine casing structure or on a wall of the aircraft engine compartment (not shown).

Figure 3:
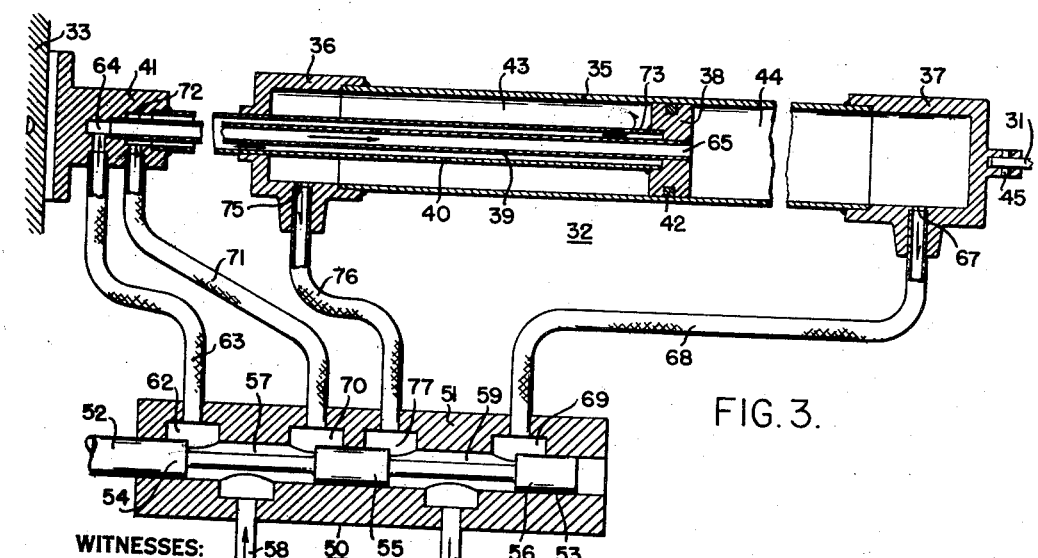
Fig. 3 is a fragmentary diagrammatic sectional view, in enlarged detail, of the actuator motor apparatus shown in Fig. 2.

According to the invention, as best shown in Fig. 3, the actuator device 32 comprises a movable cylinder 35 having closure pieces or heads 36 and 37 secured to opposite ends thereof, and slidably supported on a stationary piston member 38 which is carried on inner and outer coaxial tubes 39 and 40. A simple annular seal or O ring 42 may be mounted in a peripheral groove in the piston 38. The inner ends of the tubes are secured in suitable bores formed in a base member 41 carried on the bracket 33. Any desired means, such as sweating or welding, may be employed for securing the heads 36 and 37 to the cylinder 35, and for connecting the stationary tubes to the base 41 and piston member 38. The stationary piston member 38 is thus interposed between a pair of piston chambers 43 and 44 formed in the movable cylinder 35. With the head 37 of the latter operatively secured to the link 31 by means of a pin 45, variations in pressures of fluid in the piston chambers 43 and 44 will be effective to shift the actuator cylinder 35, thereby operating the bail 25 and rods 28 to move the nozzle closure members 17 when it is desired to change the flow area of the engine nozzle 15.

Associated with the cylinder 35 is a control valve device 50 comprising a casing 51, which may be mounted on any suitable support (not shown), and a slide or plunger valve element 52 operatively mounted in a bore 53 formed in the casing. The valve element may be manually operated, and has lands 54, 55 and 56 connected by reduced portions forming a valve chamber 57, which at all times communicates through a supply pipe 58 with a suitable source (not shown) of oil or other fluid under pressure, and a valve chamber 59 which communicates with a discharge pipe 60 leading to a zone of relatively low pressure. It will be understood that, if desired, the usual engine lubricating system having a supply pump may be adapted to effect constant supply of oil under pressure to the pipe 58, while the pipe 60 may be connected to the inlet of the same pump, or to the inlet of a separate scavenger pump of a conventional type.

The valve element 52 is adapted to control continuous flow of oil under pressure to and from both chambers 43 and 44 of the actuator device 32. The land 54 of the valve element is disposed for varying the flow of oil from the chamber 57 through a port 62 communicating with the chamber 44 by way of a flexible conduit 63, a passage 64 in the base 41, the inner tube 39 and an opening 65 in the piston 38. Discharge flow of oil from the piston chamber 44 to the valve chamber 59 is led through a passage 67 in the head 37, a flexible conduit 68 and a port 69 in casing 51 controlled by the land 56 of the valve element. The land 55 of the valve element 52 controls communication from the valve chamber 57 to a port 70 which communicates with the piston chamber 43 by way of a flexible conduit 71, a passage 72 in the base 41, the space between the outer and inner tubes 40 and 39, and an aperture 73 in the tube 40. Return flow of oil from the piston chamber 43 to the discharge chamber 59 of valve device 50 is effected by way of a passage 75 in head 36, a flexible conduit 76, and a port 77 controlled by the valve element.

In operation, oil under pressure is constantly supplied through pipe 58 to the valve chamber 57, where the flow divides, some of the oil flowing through port 62, conduit 63 and tube 39 to the piston chamber 44, while the rest of the oil flows from valve chamber 57 to the other piston chamber 43 by way of the port 70, conduit 71 and apertured tube 40. The passages 67 and 75 and associated communications already identified permit the oil to flow from the respective piston chambers 44 and 43 to the valve chamber 59 and discharge pipe 60 to the pump inlet or other low pressure zone. When it is desired to effect movement of the actuating device 32 to the right, as viewed in the drawing, the control valve element 52 is moved to the left from a neutral position such as that illustrated. When the valve element 52 is thus displaced to the left, the flow area of the port 62 is increased and that of the port 70 is reduced or throttled, without being completely closed, however. Thus, the flow of oil into the piston chamber 44 is increased while the flow into the opposite piston chamber 43 is reduced. Since the leftward movement of the valve element 52 at the same time effects increase in the flow area of the port 77 through which oil is discharged from piston chamber 43, while reducing the discharge area of the port 69 communicating with piston chamber 44, the fluid pressure in piston chamber 44 is increased relative to that in piston chamber 43. The cylinder 35 consequently is shifted to the right, as viewed in Fig. 3, while oil is continually circulated through the chambers thereof.

In order to facilitate holding of the actuator device 32 in a given position against a constant load toward the left, for example, it is only necessary that the valve element 52 be displaced slightly to the left from its neutral position. Thus the pressure drop from the pipe 58 to the port 62 is made less than that from pipe 58 to port 70, while the pressure drop from port 69 to pipe 60 becomes greater than that between port 77 and pipe 60. In consequence the fluid pressure in piston chamber 44 is built up sufficiently above that in piston chamber 43 to hold the cylinder 35 against the biasing load, without stopping the circulation of oil through the piston chambers for cooling the actuator device 32.

When the control valve element 52 is displaced in the opposite direction, or to the right as viewed in the drawing, the changes in pressure drop become the reverse of those just set forth, so that the cylinder will be urged to the left, again without stopping the flow of fluid for cooling purposes.

It will be seen from the foregoing that the invention contributes features of construction facilitating continuous circulation of motivating fluid through an improved fluid pressure motor device, thereby ensuring adequate cooling of the device and rendering feasible the use of readily available sealing elements and other parts. It will further be understood that the apparatus embodying the invention may, if preferred, be constructed and arranged with the cylinder 35 constituting a stationary member and the piston 38 operatively disposed therein and adapted for relative movement.

While I have shown the invention in but one form, it will be obvious to those skilled in the art that it is not so limited, but is susceptible of various changes and modifications without departing from the spirit thereof.

What I claim is:

A fluid pressure actuator device for a variable area turbojet nozzle having a movable nozzle element, comprising a piston member carried on spaced telescoped inner and outer fluid supply tubes; a cylinder member mounted on said piston member and having first and second piston chambers formed at opposite sides thereof; one of said members being slidably movable relative to the other of said members, said inner and said outer fluid supply tubes communicating with said first and said second piston chambers, respectively, adjacent said piston member; means connected to the slidable member adapted to operate the nozzle element, a source of fluid under pressure; a control valve device having a supply valve chamber communicating with said fluid source, an outlet valve chamber communicating with a fluid discharge port and a multiple valve element operatively mounted in both valve chambers, said supply chamber having a pair of continuously open fluid feed ports and a pair of continuously open fluid vent ports controlled by said valve element; first and second conduits each connecting one of said fluid feed ports to one of said inner and outer fluid supply tubes at portions thereof remote from said piston member, third and fourth conduits each connecting one of said fluid vent ports to one of said piston chambers adjacent the opposite ends of said cylinder; whereby said valve element is adapted to maintain constant substantially complete circulation of fluid through both of said piston chambers for cooling said actuator device, and movement of the valve element serves to reduce the flow area of one of said continuously open fluid feed passages while enlarging the other, whereby movement of the slidable member is effected.

References Cited in the file of this patent

UNITED STATES PATENTS

| Number | Name | Date |
|---|---|---|
| 635,848 | Dutton | Oct. 31, 1899 |
| 844,090 | Bijur | Feb. 12, 1907 |
| 1,219,334 | Lower | Mar. 13, 1917 |
| 1,952,806 | Hyland | Mar. 27, 1934 |
| 2,204,649 | Barnhart | June 18, 1940 |
| 2,477,490 | Martin | July 26, 1949 |
| 2,575,879 | Lombard | Nov. 20, 1951 |